United States Patent [19]

Tachita et al.

[11] 4,348,902
[45] Sep. 14, 1982

[54] ULTRASONIC IMAGING SYSTEM USING PLURAL SQUARE WAVE PULSE TRAINS OF SUCCESSIVELY DELAYED INTERVALS

[75] Inventors: Ryobun Tachita, Kawasaki; Yoshihiro Hayakawa; Kazuyoshi Irioka, both of Sagamihara; Hiroshi Fukukita, Tokyo; Tsutomu Yano, Kawasaki; Akira Fukumoto, Michida, all of Japan

[73] Assignee: Matsushita Electric Industrial Company, Limited, Osaka, Japan

[21] Appl. No.: 206,827

[22] Filed: Nov. 14, 1980

[30] Foreign Application Priority Data

Nov. 16, 1979 [JP] Japan .................. 54-149385

[51] Int. Cl.³ ............................................ G01N 29/00
[52] U.S. Cl. ....................................... 73/626; 367/105
[58] Field of Search ................. 73/626, 625, 632; 367/103, 105, 122, 138

[56] References Cited

U.S. PATENT DOCUMENTS 4,224,829 9/1980 Kawabuchi et al. ............ 73/626
4,287,768 9/1981 Hayakawa et al. ............. 73/626

Primary Examiner—Stephen A. Kreitman
Attorney, Agent, or Firm—Lowe, King, Price & Becker

[57] ABSTRACT

A sector scan ultrasonic imaging system comprises a source of a plurality of square wave pulse trains each being delayed by a unit quantization time with respect to adjacent trains, and a plurality of transmitter circuits corresponding to the elements of a transducer array. The duration of each square wave pulse is an integral multiple of the unit quantization time interval. Each transmitter circuit includes a read only memory in which a set of different digital delay time data is stored for the corresponding transducer element and is arranged to be retrieved in response to each angle increment of the ultrasonic beam transmitted from the array. Further included are a data selector for selecting a pulse train in response to a pulse train selection data retrieved from the memory and a programmable counter for counting the pulses of the selected train to generate an output in accordance with a pulse selection data retrieved from the memory. An Exclusive-OR gate is further included to provide bit inversion of the selected pulse train in selective response to the binary state of a data retrieved from the memory so that the number of available square wave pulse trains is doubled. A gating circuit responds to the output of the counter by gating a pulse of the selected pulse train to the corresponding transducer element.

4 Claims, 6 Drawing Figures

ULTRASONIC IMAGING SYSTEM USING PLURAL SQUARE WAVE PULSE TRAINS OF SUCCESSIVELY DELAYED INTERVALS

BACKGROUND OF THE INVENTION

The present invention relates generally to ultrasonic imaging systems, and in particular to a sector scan ultrasonic imaging system which is of compact design and small power consumption.

In sector scan ultrasonic imaging systems which have hitherto been known in the art, a transmitter circuit is provided for each element of the transducer array and includes a programmable counter and a pulse generator connected thereto. The programmable counter of each transmitter circuit is so present that it generates an output at a predetermined delay time with respect to the output of other transmitter circuits so that the main beam transmitted from the transducer array is deflected at an angle to the longitudinal of the array. Each counter is preset by delay time data stored in a memory provided for each transmitter circuit, and the data is so selected that the main ultrasonic beam is angle incremented to scan across a sector field. Each programmable counter is supplied with high clock rate rectangular pulses of less than 10-nanosecond duration to generate an enabling signal for the associated pulse generator when the preset count value is reached. When enabled the pulse generator drives the associated piezoelectric element of the array to cause it to transmit an ultrasonic pulse into a subject body under investigation. One disadvantage of the prior art system, however, is that because of the short-duration pulses with which each programmable counter is driven, the power consumption of the counters is considerable which imposes space limitations on the structural design. The space limitations are further imposed by the necessity of providing a pulse generator for each transmitter circuit.

SUMMARY OF THE INVENTION

Accordingly, the primary object of the present invention is to provide an ultrasonic imaging system which consumes less power than with prior art systems and is compact in design.

This invention contemplates the generation of a plurality of trains of square wave clock pulses having a duration which is an integral multiple of the unit quantization time. The clock pulses of each train are delayed by the unit quantization time with respect to the clock pulses of adjacent trains. The transmitter circuit, which is associated with each transducer element is provided with first and second pulse selection stages. One of the pulse trains is selected in the first selection stage in accordance with a first selection data and one of the pulses contained in the selected pulse train is further selected in the second selection stage in accordance with a second selection data. The first and second selection data are stored in and retrieved from a memory which is driven at each angle increment of the ultrasonic beam. The first selection stage comprises a data selector having a plurality of inputs connected to receive the pulse trains to select one of them in accordance with the first selection data. The binary state of the pulses of the selected pulse train is inverted in response to a bit inversion data which is also stored in and retrieved from the memory, so that a second plurality of pulse trains is generated, each having pulses delayed by an integral multiple of the unit quantization time with respect to the pulses of the first plurality of pulse trains to thereby double the number of available pulse trains. A second selection stage comprises a programmable counter preset in accordance with the second selection data and supplied with the pulses of the selected train to generate an output in response to the preset count value being reached. A gating circuit is included in each transmitter circuit to respond to the output of the counter by gating a selected pulse of the selected train to the associated transducer element.

Since the programmable counters are supplied with longer duration pulses than prior art programmable counters, power consumption is considerably decreased. The elimination of a pulse generator for each transmitter circuit also results in a substantial reduction in the space required.

The selection data are derived from a digital delay time data which is represented by $(2a \cdot q_1 + a \cdot q_2 + r)t_0$, where, $t_0$ = unit quantiation time interval;

a = number of square wave pulse trains;

$q_1$ = quotient obtained by dividing by pulse spacing $2at_0$ a predetermined delay time interval assigned to the associated transducer element for a given angle increment of the ultrasonic beam;

$q_2$ = quotient obtained by division of the residue of the first division by the pulse duration $at_0$; and r = residue of the second division which equals "n−1" where "n" identifies the pulse train to be selected.

The first selection data used to select the pulse train is thus represented by the data "n" or "r+1." The second selection data is represented by the parameter $q_1$ which identifies the position of a pulse to be selected among the pulses of the selected train, and the bit inversion data is represented by $q_2$ which takes on "1" or "0."

BRIEF DESCRIPTION OF THE DRAWINGS

The present invention will be further described by way of example with reference to the accompanying drawings, in which.

DETAILED DESCRIPTION

Figure 1:
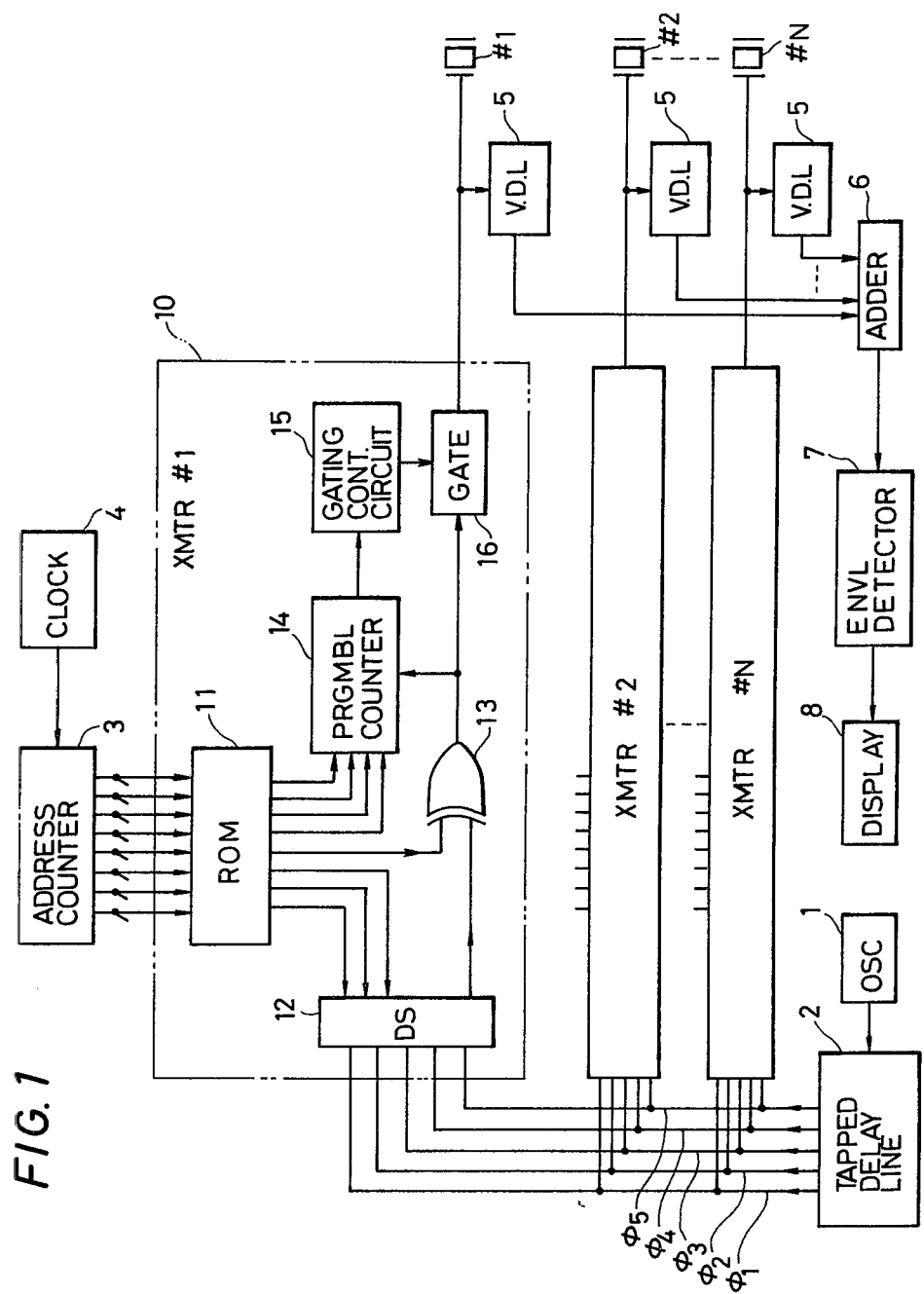
FIG. 1 is a block diagram of a sector scan imaging system embodying the present invention.

A sector scan ultrasonic imaging system of the invention is illustrated schematically in FIG. 1 as generally comprising a plurality of transmitter circuits #1, #2 to #N corresponding to the piezoelectric transducers #1 to #N which are successively arranged in a linear array. Each of the transmitter circuits is in receipt of five trans $\Phi_1$ to $\Phi_5$ of square wave pulses from a clock pulse source formed by an oscillator 1 and a tapped delay line 2, and is also in receipt of address data supplied from an address counter 3 in response to a clock pulse from a source 4 which is generated for each beam angle increment. The clock pulses of each train are delayed by a unit quantization time "$t_0$" of 10 nanoseconds or less relative to the clock pulses of another pulse train. As detailed below each transmitter circuit generates a short-duration pulse to its associated piezoelectric transducer for transmission of an ultrasound pulse into a body of solid material under investigation, particularly a human body, to receive resultant reflections from interfaces between areas of different densities. The reflected echo sound pulses are received by the transducers during receive mode and coupled through variable delay line elements 5 associated with the transducers to an adder 6. A combined output from the adder 6 is applied to an envelope detector 7 to permit detection of the envelope of the received waveform. A display unit 8 is connected to the output of the envelope detector 7 to visually display the returned echo signals in a sector field in a well known manner.

According to the inveniton, each of the transmitter circuits comprises, as shown in a broken-line rectangle 10, a read only memory (ROM) 11, a data selector 12, an Exclusive-OR gate 13, a programmable counter 14, a gating control circuit or pulse generator 15 and a gate circuit 16. In the ROM 11 is stored a set of 8-bit delay time data which is retrieved in response to an address data from the common address counter 3. The data selector 12 receives a 3-bit select command data from the ROM 11 to select one of the five pulse trains and applies the selected pulse train to an input of the Exclusive-OR gate 13 which also receives a bit inverstion data from the ROM 11. This Exclusive-OR gate provides inversion of the binary state of the selected clock pulse train when it receives a "1" bit from the ROM 11 and applies its output to the clock input of the programmable counter 14 and also to the gate circuit 16. When the bit inversion data is "0," the selected clock pulse train is passed without bit inversion to the counter 14 and to the gate 16. The programmable counter 14 receives a 4-bit count preset data from the ROM 11 to generate an output when the preset number of clock pulses has been counted.

Figure 2:
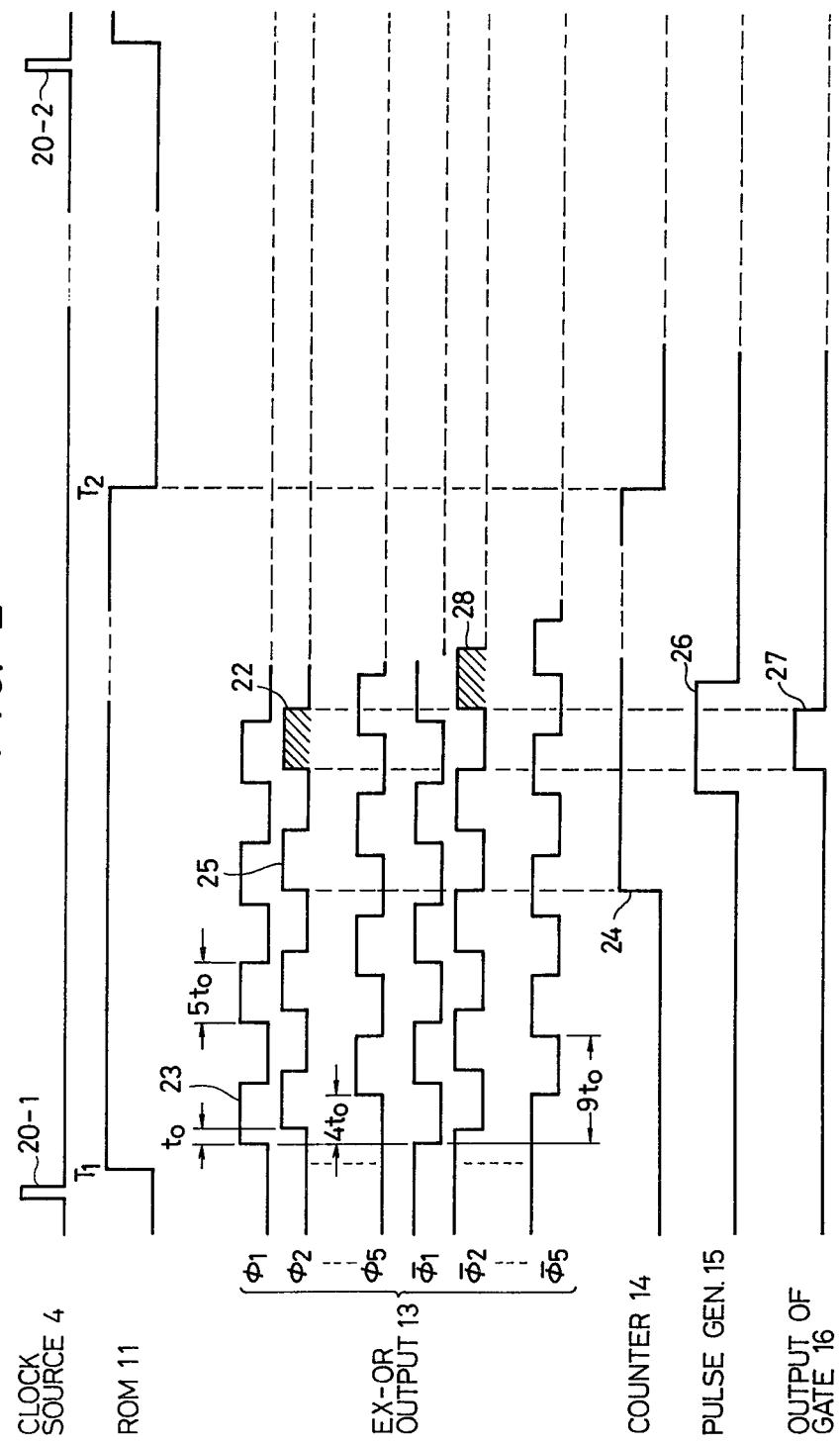
FIG. 2 is a timing diagrm illustrating various waveforms appearing in the diagram of FIG. 1.

As illustrated in FIG. 2, each of the five pulse trains $\Phi_1$ to $\Phi_5$ is displaced by an interval of $t_0$ and comprises square pulses of $5t_0$ duration. The inverted pulse trains are designated $\overline{\Phi}_1$ to $\overline{\Phi}_5$ which are delayed by intervals of $5t_0$ to $9t_0$, respectively, with respect to the pulse train $\Phi_1$.

Each digital delay time data stored in each ROM 11 is represented by a formula $(10q_1 + 5q_2 + r)t_0$, where $q_1$ is a quotient of division by pulse spacing $10t_0$ of a predetermined amount of delay which is assigned to an associated transducer for a given angular increment of the transmitted beam, $q_2$ is a quotient obtained by division of the residue of the first division by the pulse duration $5t_0$, and "r" represents the residue of the second division which is equal to "n−1" where "n" ranges from 1 to 5 corresponding to the pulse trains. The quotient $q_1$ ranges from 0 to 31 corresponding to the pulse position on each train, and $q_2$ takes on a binary level "0" or "1" depending on which set of pulse trains is to be selected. The quotient $q_1$ is used to preset the programmable counter 14 and $q_2$ is a binary data applied to the Exclusive-OR gate 13. Thus $(n−1)t_0$ indicates the amount of delay of the selected pulse train.

The operation of the embodiment of FIG. 1 will be better understood with reference to FIG. 2. A clock pulse 20 is generated by a clock source 4 at periodic intervals at each angular increment of the ultrasonic main beam transmitted from the transducer array. In response to a pulse 20−1 the address counter 3 provides an address data to the ROM 11 of each transmitter circuit. The ROM 11 is enabled for an interval between times $T_1$ to $T_2$ in the first half period of the pulse spacing between successive clock pulses 20 and 21 to retrieve each delay time data from the memory 11. Assuming that the data retrieved from the ROM 11 is such that $q_1 = 3$, $q_2 = 0$ and $n = 2$, the pulse train $\Phi_2$ is selected by the data selector 12 and a fourth ($=n+1$) pulse 22 is selected. The selected pulse 22 is delayed by an interval equal to $31t_0$ with respect to a pulse 23 or reference time. The selection of the pulse 22 is accomplished as follows: The counter 14 generates an output pulse 24 in response to the count of a third pulse 25 of the $\Phi_2$ train and enables the gating control circuit 15 to generate a gating control pulse 26 having a duration sufficient to cover the pulse 22. The gate circuit 15 thus passes the pulse 22 of the train $\Phi_2$ as indicated at 27.

With $q_1 = 3$, $q_2 = 1$ and $n = 2$, a fourth pulse 28 of the second pulse train $\overline{\Phi}_2$ can be selected since the Exclusive-OR gate 13 provides the inverted pulse train $\overline{\Phi}_2$.

The quotient and residue data are varied in response to each angle imcrement pulse supplied from the source 4 for each scan angle increment to permit selection of a desired pulse on any one of the pulse trains $\overline{\Phi}_1$ to $\overline{\Phi}_5$ as long as the quotient data $q_2$ is "1." Although it may be possible to provide a set of ten clock pulse trains from the clock pulse source 2, the present invention accomplishes a substantial reduction of component parts and therefore an overall dimension of the apparatus.

It is to be noted that the data selector 12 and counter 14 are only required to operate with a lower rate of clock pulses than with prior art techniques in which the counters are required to operate with high rates of clock pulses supplied from a single source. Therefore, the total amount of power consumed by the counters 14 is significantly reduced. This power conservation is particularly advantageous for compact design.

Figure 3:
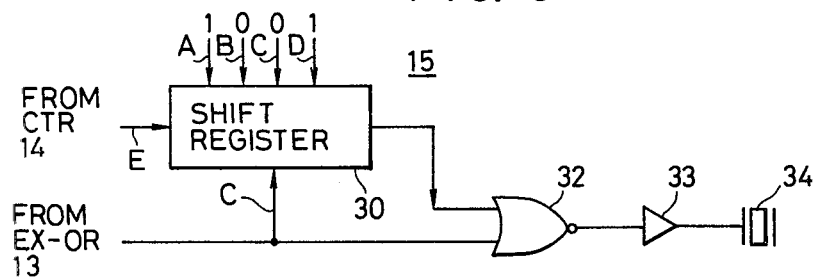
FIG. 3 is a circuit diagram of an alternative embodiment of the gating circuit of FIG. 1.
Figure 5:
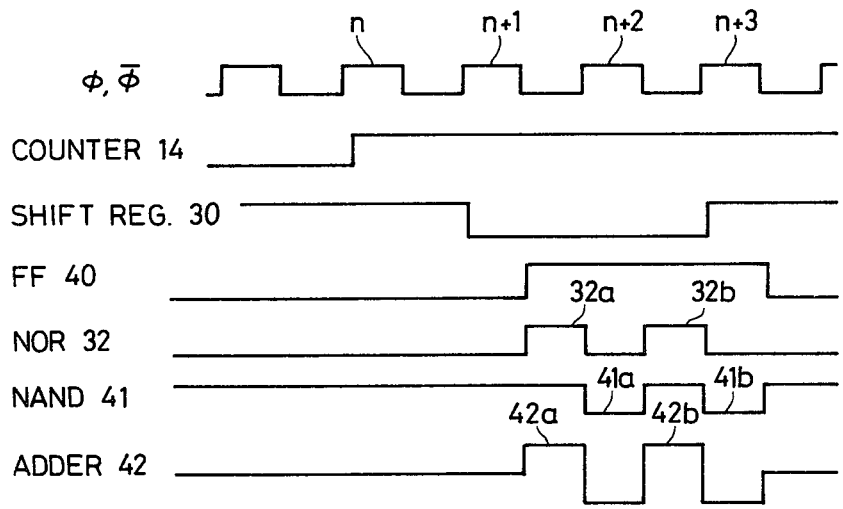
FIG. 5 is a timing diagram associated with the embodiments of FIGS. 3 and 4.

FIG. 3 is an illustration of a preferred form of the gating control circuit 15 and gate circuit 16. As shown the control circuit 15 comprises a presettable shift register 30 having data input terminals A, B, C and D respectively maintained at binary levels "1," "0," "0" and "1." The shift register 30 is enabled in response to the output of the programmable counter 14 and is clocked in response to the output of the Exclusive-OR gate 13 so that it generates a low level output in response to the receipt of the #(n+1)th clock pulse following the occurrence of the output from the counter 14 which is delivered in response to the n-th clock count. More specifically, in FIG. 5 the output of shift register 30 is driven to a low voltage level immediately following the positive edge transition of the (n+1)th clock pulse and driven to a high level immediately following the leading edge transition of the (n+3)th clock pulse. A NOR gate 32 is provided to receive its inputs from the outputs of shift register 30 and the Exclusive-OR gate 13 so that it generates two output pulses 32a, 32b. The output pulses are amplified at 33 and fed to the associated transducer 34.

Figure 4:
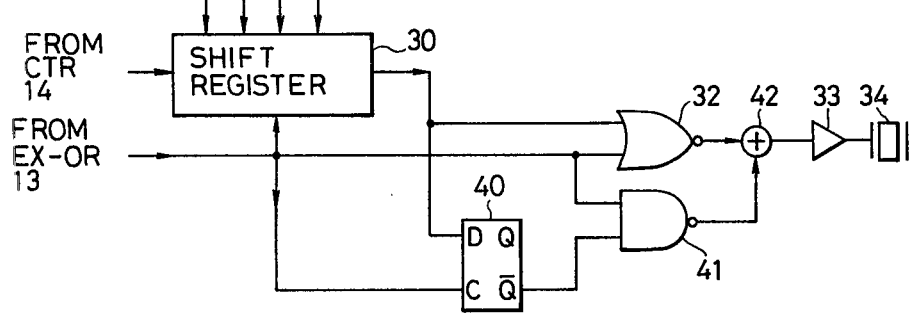
FIG. 4 is a circuit diagram of a modified form of the FIG. 3 embodiment.

FIG. 4 is a modification of the circuit of FIG. 3 in which the same numerals are used to indicate those corresponding to those of FIG. 3 having the same functions. This circuit is characterized by the inclusion of a D flip-flop 40 having its data input connected to the output of shift register 30 and its clock input connected to the output of Exclusive-OR gate 13. A NAND gate 41 takes its inputs from the Exclusive-OR gate 13 and from the $\overline{Q}$ output of flip-flop 40 and feeds its output to an adder 42 which receives its another input from the output of NOR gate 32. The output of the adder 42 is applied through the amplifier 33 to the transducer 34.

In operation, the flip-flop 40 changes the binary state of its $\bar{Q}$ output from low to high level in the presence of a low input at the data input terminal in response to the negative edge transition of the (n+1)th clock pulse and returns to the original state in the presence of a high level data input in response to the negative edge transition of the (n+3)th clock pulse. As a result, the output of the NAND gate 41 is driven to a low voltage level producing two negative going pulses 41a, 41b which are combined in the adder 42 with the two positive going pulses 32a, 32b from the NOR gate 32. Thus, two bipolar pulses 42a, 42b results from the output of the adder 42.

Figure 6:
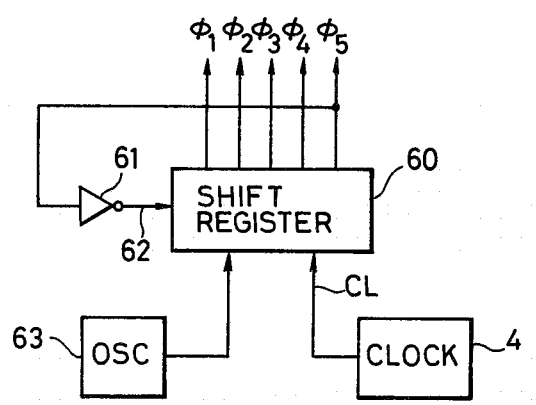
FIG. 6 is a block diagram of an alternative embodiment of the square wave pulse source of FIG. 1.

FIG. 6 is an illustration of a preferred embodiment of the clock pulse trains. A reentry type shift register 60 is arranged to be cleared by an output from the transmit clock pulse source 4 to change the binary state of its five output leads for clock pulse trains $\Phi_1$ to $\Phi_5$ to a low level. The output lead $\Phi_5$ is connected via an inverter 61 to a data input terminal 62. The high level input data on terminal 62 is clocked into the register 60 in response to an output pulse from an oscillator 63. The output of this oscillator occurs at intervals of unit quantization time $t_0$ so that the output leads of the shift register 60 is successively driven to a high logical level at unit quantization intervals.

What is claimed is:

1. An ultrasonic imaging system having an array of successively arranged piezoelectric transducers, comprising:
    a clock pulse source for generating a plurality of trains of square wave pulses each having a duration that is an integral multiple of a unit quantization time interval, the square wave pulses of each train being delayed by said unit quantization time interval with respect to the square wave pulses of adjacent trains;
    a plurality of transmitter circuits respectively corresponding to said piezoelectric transducers, each of said transmitter circuits comprising: a memory in which a set of different digital delay time data is stored, each of the delay time data including a first selection data, a bit inversion data and a second selection data; a selector for selecting one of said pulse trains in accordance with said first selection; an Exclusive-OR function means for inverting or not inverting the binary state of said selected square wave pulses depending on the binary states of said bit inversion data; a programmable counter for counting the output of said Exclusive-OR function means to generate an output in accordance with said second selection data; and means for gating the output of said Exclusive-OR function means to the corresponding piezoelectric transducer in response to the output of said counter; and
    means for retrieving each delay time data from each memory of said transmitter circuits at periodic intervals corresponding to angular increments of an ultrasonic beam transmitted from said transducer array.

2. An ultrasonic imaging system as claimed in claim 1, wherein said gating means comprises means for generating a gating control pulse in response to the output of said programmable counter and a gate for passing the output of said Exclusive-OR function means to said transducer in the presence of said gating control pulse.

3. An ultrasonic imaging system as claimed in claim 2, wherein said gating control pulse generating means comprises a presettable shift register having at least one data input terminal maintained at a predetermined binary level, said shift register being arranged to be enabled in response to the output of said programmable counter and clocked in response to the output of said Exclusive-OR function means to shift the data stored therein in one direction.

4. An ultrasonic imaging system as claimed in claim 3, further comprising a bistable device having a data input terminal connected to the output of said shift register and a clock input terminal connected to be responsive to the trailing edge transition of the output of said Exclusive-OR function means, a second gate circuit having a first input terminal connected to the output of said Excluse-OR function means and a second input terminal connected to an output terminal of said bistable device, and means for algebraically combining the outputs of the first-mentioned gate circuit and said second gate circuit to produce at least one bipolar pulse for application to said corresponding transducer.

* * * * *